United States Patent Office 2,734,829
Patented Feb. 14, 1956

2,734,829

LEAD DRIER CONCENTRATE

Funston G. Lum, Richmond, Calif., assignor to California Research Corporation, San Francisco, Calif., a corporation of Delaware No Drawing. Application July 24, 1950,
Serial No. 175,657

8 Claims. (Cl. 106—310)

This invention relates to lead compounds suitable as driers or siccatives for paints, varnishes, and the like surface-coating compositions, which dry by oxidation or polymerization. In particular, it relates to concentrated solutions of such lead metal driers in saturated aliphatic hydrocarbon thinners.

The term "paint or varnish drier" is employed in the surface-coating art to designate a compound which accelerates or promotes oxidation and polymerization of a paint, or of a varnish, and, consequently, accelerates its drying. To be most effective, a drier must be soluble in the vehicle employed in compounding a particular paint or varnish in order to facilitate incorporation and intimate distribution therein. Heavy metal soaps of various organic acids, such as 2-ethyl hexoate, various naphthenates, linoleates, and resinates are known to be effective driers soluble in hydrocarbon thinners and compatible with the conventional vehicles employed in compounding paints and varnishes.

In general, it is preferred to supply these heavy metal soaps to the paint and varnish trade in the form of the concentrates in petroleum hydrocarbon thinners readily miscible with paints, varnishes and drying oils.

Heavy metal linoleates and resinates, even though quite satisfactory as driers, possess the drawback of becoming oxidized upon storage and consequently their concentrates lose stability and effectiveness with time.

Heavy metal naphthenates, on the contrary, are relatively inert to oxidation and quite satisfactory as paint and varnish driers, lead napthenate being particularly effective as a general purpose drier. In fact, owing to its low cost, exceptional ability to promote drying of paint films, and a high solubility in solvents and oils, it is the preferred drier of the trade. However, in view of the limited source of suitable naphthenic base petroleum crude oils, drier naphthenates such as lead naphthenate are presently in short supply.

The aforementioned heavy metal soaps, which may be exemplified by lead naphthenate, are prepared by reacting metal salts or oxides with a suitable organic acid. Thus, the product of reaction of litharge with a fatty acid or a naphthenic acid is either a neutral soap when the mol ratio of the acid to litharge is equal to 2:1, or a mixture of basic and neutral soap when less than 2 mols of the acid is employed. Depending on the mol ratio of the acid to litharge and the proportion (in per cent by weight) of the basic soap in the soap mixture, this latter will be called a 60% basic lead soap, a 50% basic soap, etc. Basic lead soaps are less soluble in petroleum thinners than neutral soaps. Therefore, in the conventional practice of preparing lead drier concentrates, it is preferred to employ at least 1.4 mols of the acid for the reaction with 1 mol of litharge to secure a reaction product mixture of neutral and basic lead soaps, in which the amount of basic lead soap ranges from 0 to about 60%. Those reaction products containing lead soaps which are more than 60% basic will not have a sufficient solubility in petroleum thinner to permit the preparation of satisfactory concentrated solutions of such soaps.

In searching for new sources of paint and varnish driers a number of organic acids have been investigated. Because of the low solubility of heavy metal toluates, and particularly of lead toluate, in oils and thinners, toluic acid has never been thought to be a suitable source for the manufacture of driers. Since the solubility of lead toluate in mineral spirits, which constitutes the most frequently employed petroleum thinner for the preparation of drier concentrates, is so low that saturated solutions contain only about 2 to 3% by weight of lead metal, lead toluate could not be considered as a possible drier material.

Surprisingly, however, I have found that by reacting a solution of naphthenic and toluic acids in a petroleum thinner such as mineral spirits with an inorganic basic lead compound such as litharge, in the conventional mol ratios of from 1.4 to 2 mols of the acid to 1 mol of litharge to provide soluble basic (60% and less) to neutral soaps, an effective lead drier concentrate can be produced, in which the lead metal content is in excess of the amount dissolved by the naphthenic acid plus the expected 2 to 3% due to the solubility of the lead toluate.

I am now able to secure lead toluate-naphthenate drier concentrates having a total dissolved lead metal content from about 15% to about 35% by weight, a range considered as desirable in the preparation of drier concentrates containing lead naphthenate only. In my lead toluate-naphthenate concentrates from about 10% to about 50% of the lead is present in the form of basic (60% and less) to neutral lead toluate. In other words, the lead toluate is dissolved in amounts which introduce from about 3.0 to about 17.5% by weight of lead into solution.

In view of the aforementioned low solubility of lead toluate in petroleum thinners such as mineral spirits, the production of effective drier compositions having the aforementioned lead metal and toluic acid contents is particularly unexpected. These concentrates are similar in properties and effectiveness to the conventional lead naphthenate drier concentrates. The exact nature underlying the formation of lead toluate-naphthenate drier concentrates of my invention, upon reacting a mixture of toluic and naphthenic acids, dissolved in petroleum thinner, with an inorganic, acid-soluble lead compound such as litharge, is not well understood. It is possible that a mixed toluo-naphthenate salt is formed in the reaction, or, on the other hand, it may be that the solubility of lead toluate in petroleum thinner is unexpectedly increased owing to the solubilizing action of lead naphthenate. The fact remains, however, that the invention permits of dissolving unexpectedly high quantities of lead toluate in petroleum thinners, thereby effecting a substantial economy of naphthenic acid. This unexpected increase in the solubility of toluate soaps in the presence of naphthenate soaps has also been observed with other metals, such as zinc, cobalt, manganese, calcium, and copper.

As mentioned hereinabove, the lead metal content of my drier concentrates may vary over a wide range from about 15% to about 35% by weight. However, the lead metal content from about 20% to about 30% by weight is preferred, with lead toluate component being present in amounts from about 3% to as high as 15% by weight of lead in the solution. Concentrated solutions of this type are easily handled and satisfy the usual requirements of the surface-coating industry.

The method of preparing my paint drier concentrates is simple and straightforward. Toluic and naphthenic acids are dissolved in petroleum thinner; the solution is warmed up to a temperature of about 150 to 160° F. in a kettle provided with a reflux condenser, whereupon the acid-soluble, inorganic lead compound is introduced into the kettle, and the mixture is refluxed at a temperature from about 210 to 220° F. Steam may be employed, if desired, to agitate the reaction mixture. After about 3 to 5 hours steam is shut off, whereupon water and a part of the petroleum thinner are distilled off under vacuum to effect dehydration. Finally, after diluting with additional petroleum thinner to the desired lead content, the dehydrated concentrate is filtered to remove traces of undissolved litharge and other insoluble impurity and transferred to storage containers.

The low cost petroleum thinners suitable as solvents for the preparation of lead drier concentrates of my invention are mixtures of substantially aliphatic and naphthenic saturated hydrocarbons, containing less than about 20% aromatics, boiling from about 250° F. to about 400° F. and produced by straight distillation of crude petroleum. Particularly suitable for the purposes of the invention are those petroleum thinners known under the name of mineral spirits and boiling in the range from about 300° F. to about 400° F.

Naphthenic acids employed in the preparation of the aforementioned concentrates are those conventionally used in the manufacture of straight lead naphthenate driers and may range in molecular weight from about 270 to about 170. Their acid numbers usually run from about 200 to about 330, the acids with lower molecular weights and higher acid numbers being preferred.

Toluic acid for the reaction may be secured from any available source, e. g., from the liquid-phase oxidation of xylene with air.

Litharge represents the preferred acid-soluble lead compound for the preparation of my drier concentrate, although other suitable lead compounds, such as lead carbonates or lead acetate, may be also employed. However, in view of the higher cost of these compounds, the application of litharge is preferred.

In a typical example, 26.8 parts by weight of nahpthenic acid and 7.3 parts by weight of toluic acid were dissolved in 40.9 parts by weight of a substantially aliphatic saturated petroleum hydrocarbon distillate (petroleum thinner) boiling between 302° F. and 364° F., with 50% going over at 324° F. Its composition included 46% paraffins, 50% naphthenes and about 4% aromatics. The solution was warmed to 150° F., combined with 25.8 parts by weight of litharge and refluxed as described hereinabove. All of the reaction product went into the solution in the thinner, and the calculated 60% basic lead toluate content of the resulting drier concentrate was 15% by weight sufficient in itself to give the concentrate a lead metal content of 8% by weight; in other words, the lead metal content attributable to lead toluate was greater than the content obtainable on dissolving lead toluate in the thinner in the absence of lead naphthenate. The resulting 60% basic lead drier concentrate had a lead metal content of about 24% by weight and a non-volatile content of 58% by weight. It possessed a good low viscosity of about 0.144 poises at 77° F. Its specific gravity was 1.16 and its color was equal to about 8 to 9 (Gardner). These characteristics compare favorably with those of conventional lead naphthenate drier concentrates.

In another example, 24.8 parts by weight of toluic acid and 45.3 parts by weight of naphthenic acid were dissolved in 76.0 parts by weight of the same distillate as employed in the preceding example. The solution, upon being heated to 150° F., was combined with 58.2 parts by weight of litharge and refluxed as previously shown. The resulting drier concentrate had a lead metal content of 27% by weight and a viscosity of about 0.85 poises at 77° F. Diluted with petroleum thinner to a lead content of about 24% by weight, it displayed a very satisfactory low viscosity of 0.32 poises at 77° F. Again, the characteristics of the concentrate so obtained compared favorably with those of conventional lead naphthenate drier solutions.

The lead drier concentrates of my invention are readily soluble in drying oils and semi-drying oils, e. g. in linseed oil and soybean oil, as well as in the various substantially aliphatic saturated petroleum hydrocarbon thinners, and form stable homogeneous solutions therewith. Miscibility of drier concentrates of my invention with 350 mineral spirits, as observed on mixing 10 parts of mineral spirits with 1 part of drier, and miscibility with linseed oil, as observed on mixing 19 parts of the oil with 1 part of drier, were found to be entirely satisfactory. These solutions were left to stand in their respective containers for a period of two weeks, whereupon they were opened and examined. No precipitation, sedimentation or cloudiness was observed.

The lead drier obtained in accordance with my invention is also soluble in aromatic hydrocarbons, e. g. benzene, toluene; ketones, e. g. cyclohexanone; alcohols, e. g. methylcyclohexanol; esters; and in other effective industrial organic solvents.

The drier concentrates of my invention can be used in a great variety of surface-coating compositions, e. g. varnishes, oil-base paints and alkyd-base paints, into which they will be introduced in accordance with the conventional methods of the art. In accordance with the usual practice, in most cases it will be preferred to admix small amounts of cobalt and manganese naphthenate driers to insure quicker drying and greater hardness of the surface film. The amount of lead metal introduced into a coating composition through the application of my drier concentrates ordinarily ranges from 0.05 to 5% lead metal calculated on the oil vehicle, depending on the particular nature and use of the coating composition.

Lead drier concentrates of my invention could be also obtained by the well known precipitation (double decomposition) method. However, this procedure would call for the employment of relatively more expensive lead compounds and would involve a greater number of process steps: preparation of a solution of water-soluble alkali metal naphthenates and toluates; preparation of a solution of a suitable water-soluble lead salt, e. g. lead nitrate or lead acetate; precipitation of a water-soluble lead salt; washing of the precipitate; finally, dehydration. Therefore the hereinbefore described method of refluxing an inorganic, acid-soluble lead compound, such as litharge, with a solution of toluic and naphthenic acid in petroleum thinner is preferred for practical reasons.

In conclusion, I wish it to be understood that, while the freegoing description and examples illustrate the preferred embodiment of my invention, it is not limited thereto except as defined in the appended claims.

I claim:

1. A paint and varnish drier concentrate comprising a solution in a petroleum thinner of the reaction product of an inorganic, acid-soluble lead compound with a mixture of toluic and naphthenic acids, the lead metal content of said solution being in the range from about 15% to about 35% by weight, and the calculated lead content of the solution attributable to the introduction of lead toluate being from about 3% to about 17.5% by weight, based on the weight of the solution.

2. A paint and varnish drier concentrate comprising a solution in a petroleum thinner of the reaction product of an inorganic, acid-soluble lead compound with a mixture of toluic and naphthenic acids, the lead metal content of said solution being in the range from about 15% to about 35% by weight thereof, the portion of the lead content in the solution attributable to lead toluate being equal to more than 3% by weight and as much as 50% of the total weight of lead in the solution.

3. A paint and varnish drier concentrate comprising a solution in a petroleum thinner of the reaction product of litharge with a mixture of toluic and naphthenic acids, the lead metal content of said solution being in the range from about 15% to about 35% by weight, and the calculated lead content of the solution attributable to the introduction of lead toluate being from about 3% to about 17.5% by weight, based on the weight of the solution.

4. A paint and varnish drier concentrate comprising a solution in a petroleum thinner of the reaction product of litharge with a mixture of toluic and naphthenic acids, the lead metal content of said solution being in the range from about 15% to about 35% by weight thereof, the portion of the lead content in the solution attributable to lead toluate being equal to more than 3% by weight and as much as 50% of the total weight of lead in the solution.

5. A paint and varnish drier concentrate comprising a solution in a petroleum thinner of the reaction product of litharge with a mixture of toluic and naphthenic acids in a substantially aliphatic saturated petroleum hydrocarbon thinner, the lead metal content of said solution being in the range from about 20% to about 30% by weight, and the calculated lead content of the solution attributable to the introduction of lead toluate being from about 3% to about 15% by weight, based on the weight of the solution.

6. A paint and varnish drier concentrate comprising a solution in a petroleum thinner of the reaction product of litharge with a mixture of toluic and naphthenic acids in a substantially aliphatic saturated petroleum hydrocarbon thinner, the lead metal content of said solution being in the range from about 20% to about 30% by weight thereof, the portion of the lead content in the solution attributable to the presence of a mixture of basic and neutral lead toluates being equal to more than 3% by weight and as much as 50% of the total weight of lead in the solution.

7. A paint and varnish drier concentrate comprising a solution in a petroleum thinner of the reaction product of an inorganic, acid-soluble lead compound with a mixture of toluic and naphthenic acid, the lead metal content of said solution being in the range from about 15% to about 35% by weight, and the amount of toluic acid in said mixture of acids being in excess of the amount which would provide a lead metal content, attributable to lead toluate in said solution of the reaction product, of at least 3% by weight, based on the weight of the solution, and as high as 50% of the total weight of lead in the solution.

8. A paint and varnish drier concentrate comprising a solution in a petroleum thinner of the reaction product of an inorganic, acid-soluble lead compound with a mixture of methyl benzoic and naphthenic acids, the lead metal content of said solution being in the range from about 15% to about 35%, by weight thereof, the portion of the lead content attributable to lead toluate being equal to more than 3% by weight and as much as 50% of the total weight of lead in the solution.

References Cited in the file of this patent

UNITED STATES PATENTS

| | | |
|---|---|---|
| 1,878,962 | Meidert | Sept. 20, 1932 |
| 1,927,867 | Bruson | Sept. 26, 1933 |
| 2,102,633 | Long | Dec. 21, 1937 |
| 2,157,766 | Long | May 9, 1939 |